United States Patent
Belt et al.

(10) Patent No.: US 7,655,725 B2
(45) Date of Patent: Feb. 2, 2010

(54) PROCESS FOR THE PREPARATION OF A HYDROGENATED POLYMER

(75) Inventors: Johannes Wilhelmus Belt, Geleen (NL); Marco Marcus Matheus Driessen, Maasbracht (NL); Gerhard Vliet Van, Spaubeek (NL)

(73) Assignee: Zeon Corporation, Tokyo (JP)

( * ) Notice: Subject to any disclaimer, the term of this patent is extended or adjusted under 35 U.S.C. 154(b) by 654 days.

(21) Appl. No.: 10/521,734

(22) PCT Filed: Jul. 9, 2003

(86) PCT No.: PCT/NL03/00507

§ 371 (c)(1),
(2), (4) Date: Aug. 23, 2005

(87) PCT Pub. No.: WO2004/009655

PCT Pub. Date: Jan. 29, 2004

(65) Prior Publication Data

US 2006/0122336 A1  Jun. 8, 2006

(30) Foreign Application Priority Data

Jul. 19, 2002 (EP) .................... 02102048

(51) Int. Cl.
*C08F 236/00* (2006.01)
*C08F 2/38* (2006.01)
*C08F 36/00* (2006.01)

(52) U.S. Cl. ............... 525/64; 525/69; 525/123; 525/163; 525/242; 525/244; 525/256; 525/259; 525/262; 525/267; 525/285; 525/328.3; 525/329.3; 525/339

(58) Field of Classification Search .......... 525/64, 525/69, 123, 163, 242, 244, 256, 259, 262, 525/267, 285, 338, 339, 328.3, 329.3
See application file for complete search history.

(56) References Cited

U.S. PATENT DOCUMENTS

| 4,452,950 | A | 6/1984 | Wideman |
| 5,221,714 | A | 6/1993 | Parker |
| 5,442,009 | A | 8/1995 | Parker |
| 5,621,040 | A * | 4/1997 | Akkapeddi et al. ............ 525/64 |
| 6,211,292 | B1 * | 4/2001 | St. Clair ...................... 525/98 |
| 6,756,451 | B2 * | 6/2004 | Belt et al. ................... 525/338 |
| 6,831,136 | B2 * | 12/2004 | Chao et al. .................. 525/377 |
| 2001/0023277 | A1 | 9/2001 | Belt |

FOREIGN PATENT DOCUMENTS

| WO | 00/09568 | 2/2000 |
| WO | 01/04162 | 1/2001 |
| WO | 00/09576 | 2/2002 |

OTHER PUBLICATIONS

International Search Report for PCT/NL2003/000507.

* cited by examiner

*Primary Examiner*—Ana L Woodward
(74) *Attorney, Agent, or Firm*—Birch, Stewart, Kolasch & Birch, LLP

(57) ABSTRACT

This invention relates to a process for the preparation of a hydrogenated polymer comprising the steps of hydrogenation of at least one carbon-carbon double bond of an unsaturated polymer in latex in the presence of hydrazine, an oxidizing compound and a catalyst, followed by separation of the hydrogenated polymer from the latex. After the separation of the hydrogenerated polymer from the latex a mixing step is carried out in which the hydrogenated polymer is first mixed with an amine group containing compound and next the hydrogenated polymer is mixed with a compound that is capable of reacting with an amine. The invention also relates to the hydrogenated polymer. The invention further relates to the use of this polymer in a compounds to make an article by shaping and vulcanisation.

9 Claims, No Drawings

PROCESS FOR THE PREPARATION OF A HYDROGENATED POLYMER

CROSS REFERENCE TO RELATED APPLICATION

This application is the National Phase of International Application PCT/NL2003/000507, filed Jul. 9, 2003, which designated the U.S., was published in the English language, and is incorporated by reference herein.

The present invention relates to a process for the preparation of a hydrogenated polymer comprising the steps of hydrogenation of at least one carbon-carbon double bond of an unsaturated polymer in latex in the presence of hydrazine, an oxidizing compound and a catalyst, followed by separation of the hydrogenated polymer from the latex. The invention also relates to the hydrogenated polymer. The invention further relates to the use of this polymer in a compound to make an article.

A process for the preparation of a hydrogenated polymer is disclosed in WO 00/09568. This process comprises the hydrogenation of carbon-carbon double bonds of an unsaturated polymer in the presence of hydrazine, an oxidizing compound and a catalyst. During the process also an amine compound is added to improve the processability and to reduce the gel content. The amine compound may be added after the hydrogenated polymer is separated from the latex by mixing the amine compound and the hydrogenated polymer in an extruder.

It is a disadvantage of this process that the mechanical properties of the hydrogenated polymer are inferior.

It is the object of the present invention to provide a process for the hydrogenation of an unsaturated polymer resulting in improved cure properties and in a polymer having improved mechanical properties.

The process according to the invention is characterised in that after the separation of the hydrogenated polymer from the latex a mixing step is carried out in which the hydrogenated polymer is first mixed with an amine group containing compound where after the hydrogenated polymer is mixed with a compound that is capable of reacting with an amine.

The process results in the absence of non-reacted amine residues in the hydrogenated polymer and consequently the cure properties are improved.

Furthermore the mixing of the hydrogenated polymer containing the amine group containing compound and the compound that is capable of reacting with an amine group results in improved mechanical properties for example improved compression set properties. Said mixing also results in an improved processing of the hydrogenated polymer.

According to a preferred embodiment of the invention the compound that is capable of reacting with an amine group is a compound according to formula (I):

R—Xn  (I)

wherein:

R is derived from an (cyclo) aliphatic ($C_1$-$C_{20}$) group or a ($C_6$-$C_{20}$)aryl group, X is a unit derived from an epoxide-, an anhydride-, an isocyanate-, an acid chloride- and/or a carboxylic acid and n=1-5.

Preferably n=1-3,

More preferably n=1-2.

Suitable compounds according to formula (I) are for example phthalic acid anhydride, maleic anhydride, acetic anhydride, stearic anhydride, succinic anhydride, cyclohexane dicarboxylic acid anhydride, epoxidised natural oils for example epoxidised linseed oil, propylene oxide, cyclohexane di-epoxide, stearylchloride, acetyl chloride, toluene diisocyanate, hexane di-isocyanate, phenylene-isocyanate and/or stearic acid.

Preferred compounds are phthalic acid anhydride, maleic anhydride, acetic anhydride, stearic anhydride, tetra hydro phthalic acid anhydride, cyclohexane dicarboxylic acid anhydride, nadic anhydride and/or succinic anhydride.

More preferably the compound according to formula (I) is phthalic acid anhydride or cyclohexane dicarboxylic acid anhydride.

A suitable unsaturated polymer may for example comprise between 5 and 100% by weight of a conjugated diene monomer unit and between 95 and 0% by weight of an ethylenically unsaturated monomer unit.

Suitable examples of conjugated diene monomer units include 1,3-butadiene, 2,3-dimethylbutadiene, isoprene and/or 1,3-pentadiene.

The preferred conjugated diene monomer unit is 1,3-butadiene.

Suitable examples of the ethylenically unsaturated monomer units include unsaturated nitriles for example acrylonitrile and methacrylonitrile, monovinyl aromatic hydrocarbons for example styrene, (o-, m- and p-) alkylstyrene, divinyl aromatic hydrocarbons for example divinylbenzene, dialkenyl aromatics for example diisopropenylbenzene, unsaturated carboxylic acids and the esters thereof for example acrylic acid, methacrylic acid, crotonic acid, itaconic acid, maleic acid, methyl acrylate, ethyl acrylate, butyl acrylate, 2-ethylhexyl acrylate and/or methyl methacrylate.

The preferred ethylenically unsaturated monomer is an unsaturated nitrile and more preferred the ethylenically unsaturated monomer is acrylonitrile.

According to a preferred embodiment of the invention the unsaturated polymer is polybutadiene, polyisoprene, styrene-butadiene copolymer (SBR), acrylonitrile-butadiene copolymer (NBR), natural rubber, butadiene-isoprene rubber and/or a terpolymer of butadiene, acrylonitrile and (meth)acrylate acid or ester.

The unsaturated polymer may comprise between 50 and 80% by weight of the conjugated diene-monomer unit and between 20 and 50% by weight of the unsaturated nitrile group-containing monomer unit and more preferably between 60 and 70% by weight of the conjugated diene-monomer unit and between 30 and 40% by weight of the unsaturated nitrile group-containing monomer unit.

According to a preferred embodiment of the invention the unsaturated polymer is an acrylonitrile-butadiene (NBR) copolymer.

The unsaturated polymer may be prepared by for example an emulsion polymerisation, a solution polymerisation or a bulk polymerisation.

Preferably, the unsaturated polymer is prepared by means of emulsion polymerisation in water and the obtained unsaturated polymer becomes available in latex form. U.S. Pat. No. 5,442,009 discloses a suitable process for the preparation of the unsaturated polymer in latex.

If the unsaturated polymer is not available as a latex, the unsaturated polymer is preferably dispersed into an aqueous phase.

The latex comprising the unsaturated polymer may be hydrogenated as such. The polymer content of the latex may range between 1 and 70 wt. %, and preferably between 5 and 40 wt. %.

Preferred amine group containing compounds are amines according to formula (II):

wherein:

R is derived from an aliphatic group comprising at least one C atom or derived from an aromatic group comprising at least 6 C-atoms, X is a hydrogen atom, $NH_2$-, OH- or SH-group and Y is a $NH_2$-, OH- or SH-group.

A preferred compound is a compound according to formula (III)

Suitable examples of compounds according to formula (III) are methylamine, ethylamine, ethylene diamine, dodecylamine, methanolamine, ethanolamine, cyclohexyldiamine, o-phenylene diamine, 3,4-toluene diamine, 1,8-naphthalene diamine, aniline, o-aminophenol and/or ortho-aminothiobenzene.

Preferably the amine compound is a diamine.

More preferably the amine compound is an ortho-aromatic diamine.

The amount of amine compound may range between for example 0.01 and 5 wt %.

Preferably this amount ranges between 0.1 and 2 wt %.

The hydrazine may be used as such and may be a hydrazine-releasing compound such as for example hydrazine hydrate, hydrazine acetate, hydrazine sulphate and/or hydrazine hydrochloride. Preferably the hydrazine is hydrazine or hydrazine hydrate.

The hydrazine may be present in a molar ratio between for example 0.1:1 and 100:1 (relative to the carbon-carbon double bonds in the polymer chain). Preferably, this ratio ranges between 0.8:1 and 5:1, and this ration most preferably ranges between 0.9:1 and 2:1.

Suitable oxidizing agents are for example air, oxygen, ozone, peroxides, hydrogen peroxide, iodine, iodates and/or hypochlorite.

Preferred oxidizing agents are selected from the group comprising of peroxides and hydrogen peroxide. Most preferably the oxidizing agent is hydrogen peroxide.

The oxidizing compound is for example added in a molar ratio of between 0.1:1 and 100:1 relative to the carbon-carbon double bonds in the polymer chain. Preferably this ratio ranges between 0.8:1 and 5:1, and more preferably this ratio ranges between 0.9:1 and 2:1.

The hydrogenation step is carried out in the presence of a catalyst. Suitable catalysts are described in WO 00/09576 and the catalysts are for example compounds which contain an element from group 13 of the Periodic Table of the Elements.

Preferably, the catalyst is a compound which contains boron such as for example a borate, a peroxyborate or boric acid ($H_3BO_3$).

More preferably the catalyst is boric acid.

Other suitable catalysts are metal salts such as for example disclosed in U.S. Pat. No. 4,452,950. Suitable metal ions are for example antimony, arsenic, bismuth, cerium, chromium, cobalt, copper, gold, iron, lead, manganese, mercury, molybdenum, nickel, osmium, palladium, platinum, cerium, silver, tellurium, tin, and/or vanadium.

The preferred metal ions are iron and copper.

Most preferably the metal ion is copper.

Preferably, the oxidizing compound is added to the reaction mixture after the addition of the hydrazine.

According to a further preferred embodiment the hydrazine and hydrogen peroxide are added simultaneously to the latex during hydrogenation.

The hydrogenation may be carried out via a batch process and via a continuous process in closed and in open vessels.

Generally, the hydrogenation reaction temperature ranges between 0° C. and 250° C. Preferably the temperature ranges between 20° C. and 150° C. and more preferably the temperature ranges between 30° C. and 80° C.

Generally, the time of the hydrogenation ranges between for example 1 hour and 24 hours. Preferably, this period is less than 12 hours.

After the hydrogenation step the hydrogenated polymer is separated from the water phase of the latex. Examples of suitable separation processes are precipitation, latex dewatering via extrusion and steam stripping.

According to a preferred embodiment of the invention the separation step takes place via precipitation. The precipitation of the hydrogenated polymer latex may be carried out for example by the addition of an acid and/or salt to the aqueous dispersion of the hydrogenated polymer, or by the addition of an alcohol. Preferably a magnesium sulphate-, a calcium chloride- or an aluminium sulphate solution in water is used for the precipitation.

After the separation of the hydrogenated polymer a mixture comprising hydrogenated polymer crumb and water is obtained.

The hydrogenated polymer may be dried and the resulting hydrogenated polymer crumb may be further processed by for example a mixing step which is carried out after the separation of the hydrogenated polymer from the latex.

The mixing step may take place in for example a batch kneader or in a continuous kneader for example a single, double or multi-screw extruder.

According to a preferred embodiment of the invention the mixing step is carried out in a double screw extruder. A suitable double screw extruder may for example comprise a serie of barrels which may be divided in three zones. The first zone is the melting zone, the second zone is a mixing and reaction zone and the third zone is a mixing and reaction zone. After the third zone vacuum may be applied to remove all or a part of the injected compounds and/or solvents.

In the first zone the hydrogenated polymer is melted, in the second zone the amine group containing compound may be injected as a melt or solution and in the third zone a compound being capable to react with amine groups may be injected for example as a melt or solution into the hydrogenated polymer.

In general, the compound being capable to react with the amine groups is added after the mixing of the hydrogenated polymer and the amine compound. Preferably this compound is added after already more than 80% of the amine compound has been reacted with the hydrogenated polymer. The amine content may be determined by for example gas chromatography.

The temperature of the hydrogenated polymer melt in the extruder may range for example between 100° C. and 380° C. and preferably between 250° C. and 350° C.

It is preferred that oxygen is excluded as much as possible during the mixing step and after the hydrogenated polymer has left the extruder still being hot. To prevent exposure to oxygen cooling under nitrogen or water may be applied.

During the mixing step a mastication promotor, for example pentachlorothiophenol or its zinc salt or dibenzamidediphenyl disulfide, may be added to the hydrogenated polymer.

Preferably the mastication promotor is added together with the amine compound in the second zone.

The present invention also relates to the hydrogenated polymers obtainable by the process of the present invention. The hydrogenated polymer of the present invention shows improved mechanical properties for example the stress relaxation properties and the compression set values after curing.

The curing of the polymer may be carried out by curing with for example a sulfur containing curing system, a phenol based curing system and/or a peroxide based curing system.

Examples of suitable sulphur based curing systems are sulphur in combination with thiazole-, mercapto- or sulfenamide compounds or dithiocarbamates with metal oxides for example zinc oxide.

Examples of suitable peroxide curing agents are organic peroxides for example dicumyl peroxide, di-tert-butylperoxide, 2,5-dimethyl-(2,5-di-tert-butylperoxy)hexane, 1,3-bis(tert-butylperoxyisopropyl)benzene, 1,1-bis(tert-butylperoxy)-2,3,5-trimethylcyclohexane, benzoyl peroxide, 2,4-dichlorobenzoyl peroxide, tert-butyl peroxybenzoate, tert-butyl peroxyisopropylcarbonate, diacetyl peroxide, lauroyl peroxide, tert-butyl cumyl peroxide or a mixture of any of them.

The hydrogenated polymers according to the present invention may contain additives, such as for instance stabilizers and reinforcing agents.

Suitable stabilizers are for example free radical stabilizers, antioxidants, dihydroquinoline derivatives, benzimidazole derivatives and/or naphthylamine derivatives. Suitable examples are described in the Rubber Technology Handbook, author Werner Hofmann, Carl Hanser Verlag, Munich, Vienna, New York, 1989 at pages 264-268.

Examples of suitable reinforcing agents are carbon black and silica.

The additives may for example be added to the unsaturated polymer before the start of the hydrogenation, the additives may be added before the separation of the hydrogenated polymer. It is also possible to add the additives during the mixing step.

The compounds used for the production of the articles are produced by mixing the hydrogenated nitrile rubber obtained with the process according to the invention with rubber compounding agents such as for example fillers, reinforcing agents, plasticisers, anti-oxidants and/or vulcanisation agents in a mixing process.

The articles are made using the compounds which are shaped by extrusion or moulding and cured (vulcanized) by heating the shaped products in a mould or by heating the extrudate during a certain period of time. An article based on the products obtained with the process according to the invention is resistant to oil, heat and chemicals. The article may be applied in many technical fields such as for example automotive industry, oil industry, electrical industry, engineering industry, ship building industry, household machines, paper manufacturing industry and cable industry.

A preferred technical field is the automotive industry.

Examples of articles in the automotive industry are heat resistant automotive parts for example belts, boots, hoses and seals. These articles may be synchronous belts, power transmission, hoses, seals, gaskets, boots and bellows. Specific examples are toothed timing belts, (poly) V-belts, multi-ribbed belts, fuel hoses, air conditioning hoses, radiator hoses, heater hoses, turbo charge hoses, constant velocity joint boots and propellor shaft boots and vibration dampers. Other automotive applications include for example cylinder head O-rings, chain tensioners guides, water pump seals, transmission seals and camshaft absorbers.

Examples of applications in the oil well industry are control line protectors, oil well packers, drill pipe protectors, rotary hose, pump stators, blow out preventors and gaskets.

Examples of applications in the cable industry are military cables and marine cables.

Examples of applications in industrial machines are conveyer belts, heat exchanger membranes, heat exchanger gaskets, O-rings and pump stators.

Examples of applications in aircraft are helicopter blade coupling system, seals, gaskets and rollers for airplane holds.

In paper manufacturing hard roll covers and roll coverings may be based on the products according to the invention.

The articles may be reinforced with fibers. Suitable fibers are for example synthetic fibers such as for example nylon 6, nylon 66, nylon 46, polyester, rayon, aromatic polyamide fibers, glass fibers, steel fibers and/or carbon fibers.

These fibers may have a treatment to improve bonding with the hydrogenated polymer. An example of this treatment is a dip of a rubber latex containing a condensate of a resorcinol formaldehyde resin. The rubber latex may be for example a butadiene-vinylpyridine latex, a hydrogenated nitrile latex, an acrylonitrile-butadiene-(meth)acrylic acid latex and/or a acrylonitrile-butadiene latex. Generally glass fibers have an additional treatment before the latex treatment such as for example a treatment with a silane compound for example epoxysilane and aminosilane.

The (pretreated) fibers are combined with the rubber compound in accordance with usual methods for producing for example belts, hoses and the desired articles.

After having given the rubber compound the desired shape the vulcanisation is performed.

The polymer obtained with the process according to the invention may also be applied in thermoplastic and in thermosetting compositions such as for example in thermoplastics as reinforcement in blends with PVC, as modifier in blends with engineering thermoplastics, use in powder form, increasing oil resistance, heat resistance and impact strength and in thermosetting compositions the product may be used with for example EPDM and an acrylate. The polymer may also be applied as a plasticizer.

The process according to the present invention will be elucidated in the following experiments and examples, without being restricted thereto.

Experiment A

The Mixing of a Hydrogenated Polymer with an Amine Group Containing Compound

The hydrogenation of NBR was performed in a 2000 liter reactor equipped with stirrer, nitrogen outlet and cooling jacket.

Boric acid (9.3 kg), water (10 kg) and hydrazine 85% hydrate (72.11 kg) were charged into the reactor. After the boric acid was dissolved 380 kg of NBR latex containing 25 wt % solids was charged. The NBR had a bound acrylonitrile of 33 wt % and a Mooney of 30 (ML 1+4) at 100° C.

The hydrogenation was started under stirring with the addition of hydrogen peroxide (35 wt % in water) and lasted for 12 hrs. The addition of hydrogen peroxide was stopped when the residual hydrazine level was <5 ppm. During the hydrogenation the temperature was kept on 45° C.

The HNBR latex was coagulated in a stirred coagulation vessel by the addition of a concentrated calcium chloride solution and the wet HNBR rubber was dried in an oven at 60-70° C.

The dried HNBR was mixed with 2 wt % 3,4-toluene diamine (TDA) on a 3 liter Farrell batch kneader with a maximum temperature of 90° C.

The resulting HNBR-TDA mixture was fed into a ZSK 30 extruder L/D 39 consisting out of 14 barrels. Temperature set over the extruder was 275° C., screw speed was 250 rpm and throughput was 6 kg/h.

The extrudate was cooled in a water-bath.

EXAMPLE I

The Mixing of the Hydrogenated Polymer with a Compound that is Capable of Reacting with an Amine Group Experiment A was repeated and after the cooling in a water-bath the the extruded HNBR was mixed with 2 wt % phthalic anhydride on a 3 liter Farrel kneader.

EXAMPLE II AND COMPARATIVE EXAMPLE A

The HNBR obtained according to Experiment A and the HNBR obtained according to Example I were mixed with the components according to Table I. (the amounts are given in parts per hundred) to obtain masterbatches.

The mixing equipment was an intermeshing Shaw (K1 Intermix Mark IV) laboratory mixer with an empty volume of 5.3 L (batch weight about 3 kg).

TABLE I

| Example | II | A |
| --- | --- | --- |
| HNBR | 100 | 100 |
| ZnO active | 5 | 5 |
| Stearic acid | 1 | 1 |
| Carbon black N-772 | 40 | 40 |
| SDPA(N 445) | 1 | 1 |
| ZMMBI | 1 | 1 |
| TOTM | 7 | 7 | wherein:
SDPA(N 445) = styrenated diphenyl amine
ZMMBI = zinc-2-methylmercaptobenzimidazole
TOTM = trioctyltrimellitate

EXAMPLE III AND COMPARATIVE EXAMPLE B

The processing properties of the masterbatches according to Example II and according to Comparative Example A were determined with the Garvey Die B test (according to ASTM D 2230-73 with a die area 0.50 cm², a screw temperature of 80° C. and a zone temperature of 120° C.).

The screw speeds were respectively 30 rpm and 50 rpm as illustrated in Table II in which Comparative Example B shows the results of the masterbatch according to Comparative Example A and Example III shows the results of the masterbatch according to Example II.

TABLE II

| Example | B | | III | |
| --- | --- | --- | --- | --- |
| Screw speed (rpm) | 30 | 50 | 30 | 50 |
| Head pressure (bar) | 53 | 61 | 50 | 56 |

TABLE II-continued

| Example | B | | III | |
| --- | --- | --- | --- | --- |
| Power (kW) | 1.3 | 2.3 | 1.2 | 2.2 |
| Die swell (%) | 98 | 115 | 82 | 60 |
| Output (g/min) | 340 | 599 | 359 | 619 |
| Appearance | | | | |
| Swell and porosity | 3 | 2 | 3 | 3 |
| Edge | 1 | 2 | 3 | 3 |

The judgment of the appearance was determined visually wherein:
4 = very good;
3 = good;
2 = bad and
1 = very bad.

The addition of phthalic anhydride improves the die swell properties and the appearance of the compound based on the hydrogenated polymer.

EXAMPLES IV-V AND COMPARATIVE EXAMPLES C-D

The masterbatches according to Comparative Example B and Example II were mixed with a curing system on a Troester WNU-5 two-roll mill. The friction ratio was set at 1:1.2 and the rolls of the mill were cooled. The compounds were stored for at least one day at room temperature before use.

Example IV is directed to the curing of masterbatch II with a sulfur containing curing system. The curing took place during 20 minutes at 160° C.

Example V is directed to the curing of masterbatch II with a peroxide containing curing system. The curing took place during 20 minutes at 170° C.

Comparative Example C is directed to the curing of masterbatch B with a sulfur containing curing system. The curing took place during 20 minutes at 160° C.

Comparative Example D is directed to the curing of masterbatch B with a peroxide containing curing system. The curing took place during 20 minutes at 170° C.

TABLE III

| Example | IV | V | C | D |
| --- | --- | --- | --- | --- |
| HNBR | 100 | 100 | 100 | 100 |
| ZnO active | 5 | 5 | 5 | 5 |
| Stearic acid | 1 | 1 | 1 | 1 |
| Carbon black N-772 | 40 | 40 | 40 | 40 |
| SDPA(N 445) | 1 | 1 | 1 | 1 |
| ZMMBI | 1 | 1 | 1 | 1 |
| TOTM | 7 | 7 | 7 | 7 |
| MBT-80 | 0.63 | — | 0.63 | — |
| TMTD-80 | 1.88 | — | 1.88 | — |
| S80 | 0.63 | — | 0.63 | — |
| Perkadox 14-40 ™ | — | 6 | — | 6 | wherein:
SDPA(N 445) = styrenated diphenyl amine
ZMMBI = methyl-zinc-2-mercaptobenzimidazole
MBT-80 = 2-mercaptobenzothiazole (80%)
TMTD-80 = tetramethyl thiuram disulfide (80%)
Perkadox 14-40 ™ = peroxide based curing agent
TOTM = trioctyltrimellitate
S80 = sulphur (80%)

The compression set (according to ISO 815 Type B) and the stress relaxation (according to ISO 3384 Method A) of the products of Examples IV-V and Comparative Examples C-D were determined.

The results are given in Table IV and in Table V.

TABLE IV

|  | C | IV |
|---|---|---|
| Compression set % | | |
| 22 h/70° C. | 40 | 32 |
| 22 h/100° C. | 53 | 48 |
| 22 h/150° C. | 72 | 67 |
| Stress Relaxation % | | |
| 24 h 100° C. | 65 | 77 |
| 72 h | 53 | 70 |
| 168 h | 49 | 64 |
| 336 h | 42 | 54 |
| 672 h | 41 | 49 |
| 2016 h | 24 | 40 |

Table IV shows that the stress relaxation properties and the compression set properties of sulfur vulcanisates were improved by the addition of phthalic anhydride.

TABLE V

|  | D | V |
|---|---|---|
| Hardness IRHD | 51 | 59 |
| Tensile strength Mpa | 11 | 20 |
| Compression set % | | |
| 22 h/−25° C. | 99 | 95 |
| 70 h/23° C. | 62 | 38 |
| 22 h/70° C. | 79 | 39 |
| 22 h/100° C. | 80 | 41 |
| 22 h/150° C. | 82 | 50 |

Table V shows that the compression set properties of peroxide vulcanisates were improved by the addition of phthalic anhydride.

The invention claimed is:

1. A process for the preparation of a hydrogenated acrylonitrile-butadiene copolymer comprising the steps of:
hydrogenation of at least one carbon-carbon double bond of an unsaturated acrylonitrile-butadiene copolymer in latex in the presence of hydrazine, an oxidizing compound and a catalyst, followed by
separation of the hydrogenated acrylonitrile-butadiene copolymer from the latex wherein after the separation of the hydrogenated acrylonitrile-butadiene copolymer from the latex a mixing step is carried out in which the hydrogenated acrylonitrile-butadiene copolymer is first mixed with an amine group containing compound and next the hydrogenated acrylonitrile-butadiene copolymer is mixed with a compound that is capable of reacting with an amine, wherein the compound that is capable of reacting with an amine group is a compound
selected from the group consisting of phthalic acid anhydride, maleic anhydride, acetic anhydride, stearic anhydride, tetrahydrophthalic acid anhydride, cyclohexanedicarboxylic acid anhydride, nadic anhydride and succinic anhydride.

2. The process according to claim 1, wherein the amine group containing compound is an amine according to formula (III):

wherein
R is derived from an aliphatic group comprising at least one C atom or derived from an aromatic group comprising at least 6 C atoms, and
X is a hydrogen atom, $NH_2$-, OH- or SH-group.

3. The process according to claim 1, wherein the catalyst is a compound which contains boron.

4. A hydrogenated acrylonitrile-butadiene copolymer obtained by the process according to claim 1.

5. An article based on the acrylonitrile-butadiene copolymer according to claim 4.

6. The article according to claim 5, wherein the article is applied in the automotive industry, in the oil industry, in the electrical industry, in the engineering industry, in the ship building industry, in household machines, in the paper manufacturing industry or in the cable industry.

7. The article according to claim 6, wherein the article is a belt, a hose, a gasket, a boot, a bellow, a vibration damper or a seal.

8. A thermoplastic composition comprising a thermoplastic material and a hydrogenated acrylonitrile-butadiene copolymer according to claim 4.

9. A thermosetting composition comprising a thermosetting material and a hydrogenated acrylonitrile-butadiene copolymer according to claim 4.

* * * * *